United States Patent
Bourqui et al.

(10) Patent No.: US 6,756,710 B2
(45) Date of Patent: Jun. 29, 2004

(54) ELECTRICAL ROTATING MACHINE AND PROCESS FOR THE MANUFACTURE THEREOF

(75) Inventors: Gerald Bourqui, Villars-sur-Glane (CH); Jean-Louis Linda, La Tour-de-Treme (CH); Roger Meuwly, Cournillens (CH); Marcel Tornare, Fribourg (CH)

(73) Assignee: Conception et Developpement Michelin, Givisiez (CH)

( * ) Notice: Subject to any disclaimer, the term of this patent is extended or adjusted under 35 U.S.C. 154(b) by 0 days.

(21) Appl. No.: 10/178,141

(22) Filed: Jun. 24, 2002

(65) Prior Publication Data

US 2003/0001440 A1 Jan. 2, 2003

Related U.S. Application Data

(63) Continuation of application No. PCT/EP01/12290, filed on Oct. 24, 2001.

(30) Foreign Application Priority Data

Oct. 25, 2000 (FR) .............................................. 00 13783

(51) Int. Cl.$^7$ .............................................. H02K 15/12
(52) U.S. Cl. .............................. 310/44; 310/71; 310/43; 310/45
(58) Field of Search .............................. 310/43, 71, 44, 310/45

(56) References Cited

U.S. PATENT DOCUMENTS

| 3,710,437 A | | 1/1973 | Kipple et al. ................. 29/596 |
| 3,867,658 A | * | 2/1975 | Dochtermann ................ 319/71 |
| 3,874,073 A | | 4/1975 | Dochterman et al. ......... 29/598 |
| 4,128,527 A | | 12/1978 | Kinjo et al. ................... 29/596 |
| 5,787,950 A | | 8/1998 | Muhlhoff et al. ......... 152/395.3 |
| 6,137,201 A | * | 10/2000 | Umeda et al. ............... 310/179 |

FOREIGN PATENT DOCUMENTS

| CA | 2135566 | 6/1995 | ............ H01B/3/04 |
| EP | 0266602 | 5/1988 | ............ H02K/3/30 |
| EP | 0660336 | 6/1995 | ............ H01B/3/40 |

* cited by examiner

Primary Examiner—Karl Tamai
Assistant Examiner—Iraj A. Mohandesi
(74) Attorney, Agent, or Firm—Fitzpatrick, Cella, Harper & Scinto

(57) ABSTRACT

The stator for an electrical machine comprises a laminated magnetic circuit 1 having a plurality of teeth delimiting longitudinally oriented slots, electrically conductive wires 2 being disposed in the slots, and winding heads 3 at the ends of the stator. An outer sheath 4 forms part of the final motor. The stator includes a composition 6 for impregnating the winding heads, of which the filler has a large particle size, and a slot-impregnating composition 8, containing a filler of smaller particle size.

12 Claims, 3 Drawing Sheets

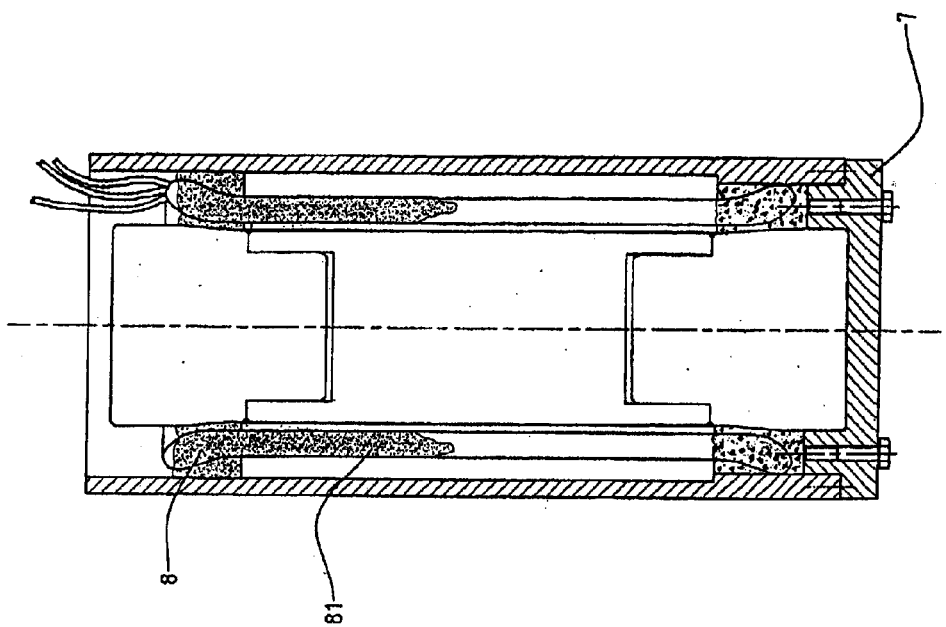
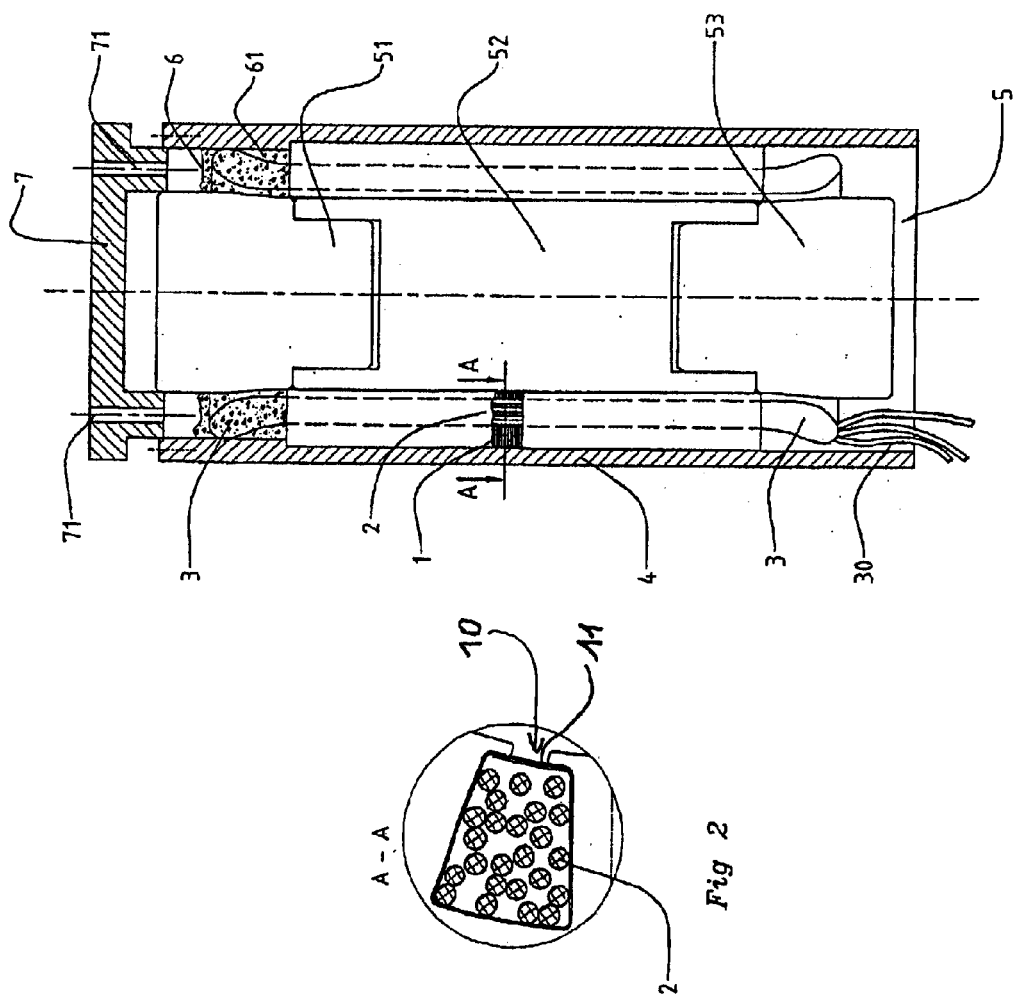

ELECTRICAL ROTATING MACHINE AND PROCESS FOR THE MANUFACTURE THEREOF

CROSS REFERENCE TO RELATED APPLICATIONS

This is a continuation of international application PCT/EP 01/12290 filed Oct. 24, 2001, which was published in French as international publication WO 02/35685 A1 on May 2, 2002 and which claims priority to French application 00/13783 filed Oct. 25, 2000.

BACKGROUND OF THE INVENTION

1. Technical Field of the Invention

The present invention relates to electrical rotating machines, whether motors or generators, and more precisely to the stators thereof.

2. The Related Art

In a known construction, the stator of machines of the foregoing type has a magnetic circuit and windings of electrically conductive wires which in general are made from insulated copper wire, often round in cross section. The magnetic circuit, for its part, is laminated; i.e., it is formed by a stack of magnetic metal sheets. Each metal sheet is cut to shape such that slots delimited by teeth are made, the slots being the seatings for the electrically conductive wires. This principle of arranging the stator is widely applied in synchronous or asynchronous machines.

There are applications for which it is desirable to simultaneously obtain both high power levels and highly compact constructions of the motor. To give just one concrete example, when the intention is to install electric traction motors in the wheels of automotive vehicles, it is desirable to be able to develop power levels of at least 10 kW per motor, and even at least 25 or 30 kW per motor for the majority of the time, for a weight as low as possible in order not to make the unsprung masses too heavy. It is also desirable for the bulk to be very small, not going beyond or going beyond by as little as possible, the internal volume of the wheel, so that the motor does not interfere with the elements of the vehicle in the event of flexing of the suspension and in the event of other types of movement of the wheel with respect to the vehicle body.

These requirements (high power level and low weight and bulk) make it very problematic to install electric traction motors in the wheels of private vehicles without radically improving the ratio of weight to power of the electrical machines currently available on the market.

Moreover, the heating caused by losses of the motors must be contained within certain limits, or else irreversible degradation occurs, in particular with respect to the insulation of the electrical conductors. The heat produced in the stator conductors must thus be dissipated as effectively as possible.

In the most demanding applications, it is already well known to cool electrical rotating machines by means of a liquid. In this case, forced circulation of the liquid is provided within the electrical rotating machine itself, principally the stator, in which the electrical windings are located, so that the heat is guided out to a heat exchanger.

In order properly to hold the electrical conductors mechanically in their slots, to; reinforce the electrical insulation and indeed to contribute to good heat exchange by conduction, it is already known to impregnate the electrical conductors in resin, which fills the various slots and covers the winding heads on either side of the stator.

Unfortunately, although impregnation of the conductors with resin proves indispensable in high-performance motors, the resins used to impregnate the conductors in the slots are materials which are relatively poor heat conductors. It is also known to use resins containing fillers, which are better conductors of heat, to impregnate the conductors of the winding heads. Unfortunately, the resins used in the winding heads are not suitable for impregnating the conductors in the slots. The fillers cannot penetrate into the small spaces remaining in the slots, and this is all the more true in high-performance motors because a high level of filling the slots with copper is sought.

Furthermore, dissipation of the heat produced in the slots is problematic. In fact, there are currently faults in the impregnation; in other words, bubbles (of air or degassing products) remain trapped inside the mass of the conductors and resin. The consequence is that the heat exchange taking place where these faults in the impregnation exist is much less effective, since it cannot take place by conduction. The result is a local rise in temperature, which can have an adverse effect on the proper behaviour of the electrical insulating materials used and, as a consequence, cause thermal breakdown phenomena in the electrical rotating machines.

SUMMARY OF THE INVENTION

One object of the invention is to radically improve the heat performance of electrical rotating machines.

Another object is to bring about the much more homogeneous and improved quality impregnation of the electrical conductors in the slots.

A further object is to allow impregnation by a resin which is a sufficiently good beat conductor.

This is most particularly important if the rated torque of an electrical rotating machine is to be increased. To this end, the aim is to be able to introduce as high a current as possible. The consequence is inevitably Joule's heat losses, as a result of which heat is produced in the conductors located in the slots and in the winding heads and has to be dissipated as effectively as possible.

The invention relates to an electrical rotating machine comprising a stator, the stator comprising a laminated magnetic circuit having a stack of magnetic metal sheets disposed substantially parallel to a plane perpendicular to the axis of rotation of the rotor of the machine, the magnetic circuit having a plurality of teeth, the teeth delimiting longitudinally oriented slots, electrically conductive wires being disposed in the slots, the ratio of the sum of the sections of the squares circumscribing the section of each conductive wire to the useful slot section being greater than 0.7 for each slot. The electrical wires are kept immobile in the slots by a slot-impregnating composition containing a heat-setting resin and a filler, which slot-impregnating composition comprises at least 65% by mass of the filler.

The ratio indicated above denotes a very high level of filling the slots with the conductive wires. Machines of high specific output are to be constructed.

In a first aspect, the particle size of the slot-impregnating composition is such that the average size of the particles of which it is composed is less than approximately 15 $\mu$m, and is such that at least approximately 80% by mass of the particles are less than 25 $\mu$m in size.

In fact, the nature of the filler indicated above is not unrelated to the diameter or, more generally, the size of the section of the conductive wires used. If the nature indicated is very well matched to wires having a diameter in the order of 1.2 mm to 1.5 mm, which are themselves well matched to the machines of high specific output to which the invention relates, one may also take the view that, in another aspect, the particle size of the filler is such that the maximum size of the particles of which it is composed is less than $0.045*\phi$, where $\phi$ is the diameter of the electrically conductive wires disposed in the slots.

Preferably, the particle size of the filler is such that at most 3% by mass of the particles are above 50 $\mu$m in size.

This filler is preferably silica flour (silicon oxide), quartz (a crystalline form of silica), aluminum nitride or alumina. It has been found that these fillers radically improve the performance levels of an electrical machine, in particular when they are used in accordance with the process below.

It is also known that the stator has winding heads at the two axial ends of the magnetic circuit The invention also relates to an electrical rotating machine in which the conductors in the winding heads are impregnated with a composition for impregnating winding heads which contains a heat-setting resin and a filler of larger particle size than the particle size of the filler of the slot-impregnating composition.

To clarify these concepts, the difference in particle size can be qualified by reference to the size of the particles and their distribution over different sizes. For example, the filler of large particle size has approximately from 30 to 55% by mass of particles having a size between 500 $\mu$m and 1000 $\mu$m; it has approximately from 25 to 45% by mass of particles having a size between 200 $\mu$m and 600 $\mu$m, with the remainder being composed of at least 5% by mass of particles of which at least 80% by mass are below 25 $\mu$m, and preferably below approximately 20 $\mu$m in size, and at most 3% by mass are above 50 $\mu$m, and preferably above approximately 45 $\mu$m in size.

For its part, the filler of lower particle size is characterized by an average size of the particles of below approximately 15 $\mu$m, and preferably below approximately 10 $\mu$m, and has at least approximately 80% by mass of particles of which the size is below 25 $\mu$m, and preferably below approximately 20 $\mu$m, and has no more than approximately 3% by mass of particles of which the size is above 50 $\mu$m, and preferably above approximately 45 $\mu$m.

It has been found that a filler of the foregoing kind allows the thermal conductivity of the slot-impregnating composition to be improved, and that the improvement in the properties of thermal conductivity of the composition is not accompanied by a disadvantageous increase in the viscosity of the composition.

Preferably, in order to achieve values for thermal conductivity which are really very high for a slot-impregnating material, the slot-impregnating composition comprises at least 70% by mass of the filler.

The invention also proposes a process for manufacturing a stator of an electrical rotating machine, the stator comprising a laminated magnetic circuit having a stack of magnetic metal sheets disposed substantially parallel to a plane perpendicular to the axis of rotation of the rotor of the machine, the magnetic circuit having a plurality of teeth, the teeth delimiting longitudinally oriented slots, the process comprising the following steps:

installing electrically conductive wires in the slots and forming winding heads at the two axial ends of the magnetic circuit;

installing on a vertical axis the assembly having the magnetic circuit supporting the conductors in the slots and the winding heads;

impregnating under vacuum the conductors in the slots with a slot-impregnating composition comprising a heat-setting resin and a filler; and proceeding to polymerisation of the composition.

In order to use impregnating compositions, both containing fillers and differing at least in their fillers, the invention proposes a process for manufacturing a stator of an electrical rotating machine, the said stator comprising a laminated magnetic circuit having a stack of magnetic metal sheets disposed substantially parallel to a plane perpendicular to the axis of rotation of the rotor of the machine, the magnetic circuit having a plurality of teeth, the teeth delimiting longitudinally oriented slots, the process comprising the following steps:

installing electrically conductive wires in the slots and forming winding heads at the two axial ends of the magnetic circuit;

installing on a vertical axis the assembly having the magnetic circuit supporting the conductors in the slots and the winding heads;

impregnating the first winding head, in an axially upper position, with a composition for impregnating winding heads, comprising a heat-setting resin and a filler of large particle size;

turning around the assembly and installing it once again on a vertical axis, so that the first winding head becomes the lower winding head;

impregnating under vacuum the conductors in the slots with a slot-impregnating composition comprising a heat-setting resin and another filler of smaller particle size than the particle size of the filler of the first composition;

impregnating the second winding head with a composition for impregnating winding heads, comprising a heat-setting resin and a filler of large particle size; and proceeding to polymerisation of the compositions.

BRIEF DESCRIPTION OF THE DRAWINGS

For a better understanding of the invention, reference may be made to the following description of exemplary embodiments thereof, taken together with the accompanying drawings, in which:

FIG. 1 is a section comprising the axis of a rotating machine, illustrating an initial phase in the process according to the invention;

FIG. 2 is a partial section along the line AA in FIG. 1;

FIG. 3 is a section comprising the axis of the rotating machine, illustrating a later phase in the process according to the invention;

DETAILED DESCRIPTION OF EXEMPLARY EMBODIMENTS

Figure 5:
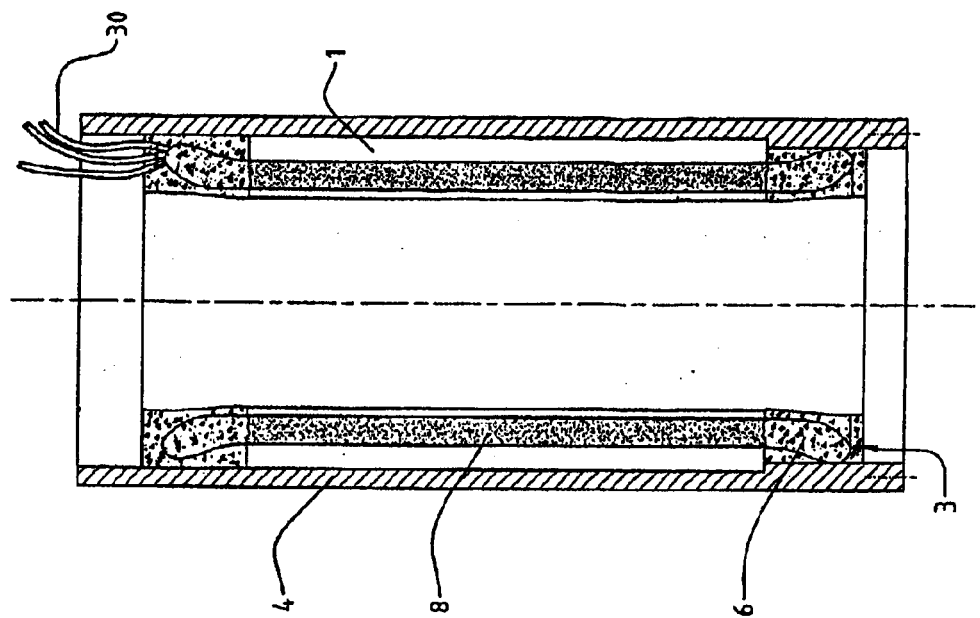
FIG. 5 is a section comprising the axis of the rotating machine, showing the stator thus obtained.

The invention proposes a specific impregnating composition for impregnating electrical conductors made from varnished copper. Described below is the application to impregnation in slots and impregnation in winding heads.

The compositions proposed comprise a heat-setting resin and various additives for the application thereof. Some non-restrictive examples are given below so that the invention is fully explained. However, since the invention does not per se relate to the resin, many variants may be adopted, and those skilled in the art are invited to refer to the conventional prior art as regards the resin.

The slot-impregnating resin may be prepared as follows. In a first example, a silica flour (SIKRON B800, available from Quarz Werke) is put in an oven to bring it to 130° C. The epoxy resin formulation is prepared. 100 parts (by mass) of CY 179 resin are mixed with 115 parts of HY 917 curing agent. 30 parts of DY040 plasticizer and 0.05 to 2 parts of DY070 accelerator are added, depending on the rate of cross-linking desired (all the products mentioned in relation to the resin being available from VANTICO). This composition is then brought to a temperature of 100° C. and a few drops—that is to say approximately 0.05 to 0.10 parts—of BYK A501 (BYK-CHEMIE), an anti-foaming agent, are added. 455 parts of filler are introduced gradually into 245 parts of resin, and this is mixed until a homogeneous liquid is obtained while remaining at elevated temperature. The final mixture is degassed under vacuum until the bubbles have disappeared. The composition obtained thus comprises approximately 65% by mass filler and 35% by mass resin. The slot-impregnating composition is then ready to be cast. The filler used is of small particle size and of sufficient fluidity for the intended application, and ensures thermal conductivity which remains significant (in the order of 0.9 W/mK).

Another slot-impregnating composition may be produced by using as the filler alumina, or aluminium oxide (CL 4400 FG, available from ALCOA). The alumina is put into an oven to bring it to 140° C. To prepare the resin, 100 parts (by mass) of CY 179 resin are mixed with 115 parts of HY 917 curing agent 30 parts of DY040 plasticizer are introduced (all the products mentioned above being available from VANTICO). 6 parts of BYK 9010 dispersing agent (BYK-CHEMIE) are added, plus a few drops—that is to say approximately 0.10 parts—of anti-foaming agent (BYK A501 from BYK-CHEMIE). Then, this composition is brought to a temperature in the order of 60° C. to 70° C. 714 parts of filler are introduced rapidly into 251 parts of resin, and this is mixed until a homogeneous suspension which can be used for the impregnation is obtained. The final mixture is degassed under vacuum until the bubbles have disappeared. The composition thus obtained comprises approximately 74% by mass alumina and 26% by mass resin. The slot-impregnating composition is then ready to be cast, and withstands relatively elevated application temperatures (in order to facilitate its use, it can be heated on a winding which is itself heated to approximately 120° C.). After application, this composition can be cured in successive stages at different temperatures greater than 140° C. and at most 180° C. The thermal conductivity obtained is higher (in the order of 1.6 W/mK)

The use of the dispersing agent allows a relatively large proportion of filler to be incorporated, with the result that upon exceeding 70% the conductivity of the composition obtained can be increased significantly. It is even possible to reach conductivity on the order of 2.0 W/mK if 80% alumina is incorporated.

Increasing the percentage of filler in the composition normally pronyotes an increase in the thermal conductivity, chiefly if a certain threshold is exceeded. However, this also increases the viscosity, which makes application more difficult. The viscosity is an important parameter, because it is viscosity, combined with temperature of application, which contributes in particular to whether the impregnating composition is usable or not. It should be noted that the degree of conductivity is also dependent on the regularity of distribution of the filler in the final composition. Effectively, increasing (by the use of a dispersing agent, for example) the regularity of distribution of the filler particles brings about a decrease in the viscosity, but also in the thermal conductivity. From this point of view, it is desirable (all other things being equal) for the viscosity of the composition ready to be cast to be at a sufficiently high level which remains compatible with the later impregnating phase described below.

In the example which follows, and which still relates to slot impregnation, it is proposed to prepare two intermediate mixtures called mixtures A and B, both having fillers of alumina (CL 4400 FG) which has previously been stored.

Mixture A, which is prepared by the method indicated in the second example above, has the following components: CY 179 resin (100 parts), DY 040 plasticizer (30 parts), BYK 9010 dispersing agent (2.4 parts), BYK A501 anti-foaming agent (0.1 parts) and CL 4400 FG filler (286 parts). The suspension is stored in an appropriate container and allowed to cool.

Mixture B, which is prepared by the method indicated in the second example above, has the following components: HY 917 curing agent (115 parts), BYK 9010 dispersing agent (3.6 parts), BYK A501 anti-foaming agent (0.1 parts) and CL 4400 FG filler (429 parts). The suspension is stored in an appropriate container and allowed to cool.

Since the curing agent and the resin have not been mixed, mixtures A and B may be stored for several days and probably much longer without degrading in a disadvantageous manner. To prepare the impregnating composition, the procedure is as follows:

1. put the mixtures A and B in an oven at between 70° C. and 80° C.;
2. homogenize the suspensions; and
3. weigh the mixtures A (100 parts) and B (131 parts), mix them and then degas under vacuum.

The impregnating resin is then used at a temperature between 80° C. and 100° C.

An example of the composition for impregnating winding heads is given below. There is used: 308 parts of alumina, or aluminium oxide (CL 4400 FG, available firm ALCOA), of which at least 80% by mass of the particles is of a size below 20 $\mu$m and at most 3% by mass is of a size above 45 $\mu$m, 617 parts of alumina of which the particles are of a size between 500 $\mu$m and 1000 $\mu$m, and 463 parts of alumina of which the particles are of a size between 200 $\mu$m and 600 $\mu$m. To prepare the resin, 100 parts (by mass) of CY 179 resin is mixed with 115 parts of HY 917 curing agent. 30 parts of DY040 plasticizer are introduced (all the products mentioned above being available from VANTICO). Then, 0.10 parts of anti-foaming agent (BYK A501 from BYK-CHEMIE) are added. Next, this composition is brought to a temperature on the order of 60° C. to 70° C. and the filler, previously heated to approximately 140° C. is introduced into the resin, and the result is mixed until a homogeneous suspension which can be used is obtained. The final mixture is degassed under vacuum until the bubbles have disappeared. The composition thus obtained comprises approximately 85% by mass filler and 15% by mass resin. After application, this composition can be cured in successive stages at different temperatures greater than 140° C. and at most 180° C. The thermal conductivity obtained is very high (on the order of 4.0 W/mK).

To summarize, the slot-impregnating composition advantageously comprises at least 65% filler. If a composition optimized for the impregnation of winding heads is used, the composition will advantageously comprise at least 85% filler.

The compositions indicated are particularly well suited to the perfect impregnation of the conductors, in particular using the processes described below.

Visible in particular in FIG. 1 is a stator comprising a laminated magnetic circuit 1 having a stack of magnetic metal sheets disposed substantially parallel to a plane perpendicular to the axis, the magnetic circuit having a plurality of teeth, the teeth delimiting longitudinally oriented slots, and electrical conductor wires 2 being disposed in the slots. Also visible are winding heads 3 at the ends of the stator and the exit points 30 of wires of the winding at one of the winding heads. It should be emphasized that FIG. 2 is only a diagram in which, for clarity, only some electrical conductor wires 2 have been illustrated. The number of electrical conductor wires 2 seen there is not representative of the very high level, characteristic of the invention, to which the slot is filled. In this connection, it should also be noted that the useful section of the slot for the installation of copper wires is the geometric section of the space in the slot out of which there is taken the section occupied by other elements which may be installed in the slot, such as an insulating film 11 covering the internal walls of the slots (see FIG. 2). The useful section corresponds to the surface area of the section limited by the insulating film 11, the section of which is not included in the useful section. In the event, which is very common, that the electrically conductive wires 2 are circular in cross-section, the square circumscribing the section of each conductive wire is a square of which a side has the value of the diameter of the electrically conductive wire 2. Let S1 be the sum of the sections of the squares circumscribing the section of each conductive wire. Let S2 be the useful section. The ratio S1/S2 allows the level to which the slots are filled by the conductive wires to be quantified. It has been mentioned above that this is a very high level.

1 Before the first step of impregnation, the assembly comprising the magnetic circuit 1 supporting the conductors 2 and the windings head 3 is trapped between an outer sheath 4, forming part of the final motor, and a removable inner core 5, in this case in three parts 51, 52, 53, substantially occupying the volume to be reserved for the rotor. It goes without saying that the core 5 is coated with a mold release composition, since it has to be disassembled later.

As can be seen in FIG. 1, before the upper winding head 3 is impregnated the assembly comprising the magnetic circuit 1 supporting the conductors 2 and the winding heads 3 is installed on a vertical axis. The exit points of the wires 30 are on the lower side. Impregnation of the first winding head 3 in the axially upper position is then performed, using a composition 6 for impregnating winding heads of which the filler 61 has a high particle size. The composition has a very high thermal conductivity, preferably above 3 W/mK and advantageously above 4 W/mK. It is possible to use an impregnating composition proposed above as the composition for impregnating winding heads. Another example of a composition that may be used, and which in this instance is commercially available, is the composition sold under the name "STYCAST 2850 KT" (available from EMERSON & CUMING).

Next, the axial end of the side of the winding head 3 which has already been impregnated is closed off using a closure 7 having vents 71. Preferably, the quantity of the composition for impregnating the winding heads introduced will be such that the composition rises up slightly inside the vents 71. The vents 71 are then closed off.

Then, the assembly is turned around and installed once again on a vertical axis, so that the first winding head 3 becomes the lower winding head (see FIG. 3).

The slot-impregnating composition 8 containing a filler 81 is cast under vacuum, on windings which have previously been heated to a temperature of approximately 100° C., in order to promote impregnation by means of low viscosity. Preferably, during the impregnation of the conductors in the slots, the total quantity of slot-impregnating composition is introduced successively in portions, for example in two or three portions, and after each portion there is a phase of gradual return to atmospheric pressure, or even an increase to a pressure higher than atmospheric pressure, and then a return to a vacuum. An alternation of the phases of increasing pressure and return to a vacuum in order to introduce each portion promotes a high degree of homogeneity in the impregnation. Thus, the electrical rotating machine is much less subject to thermal breakdown when it is put under high load. Preferably, the total quantity of slot-impregnating composition introduced will be such that the composition overflows slightly onto the upper winding head.

Before continuing the impregnation, any excess slot-impregnating composition present in the second winding head is removed, and where appropriate at least a partial polymerisation of the slot-impregnating composition is performed in order to prevent the latter, which is of lower density than that which is to be used to impregnate the second winding head, from mixing with the composition for impregnating the second winding head.

Figure 4:
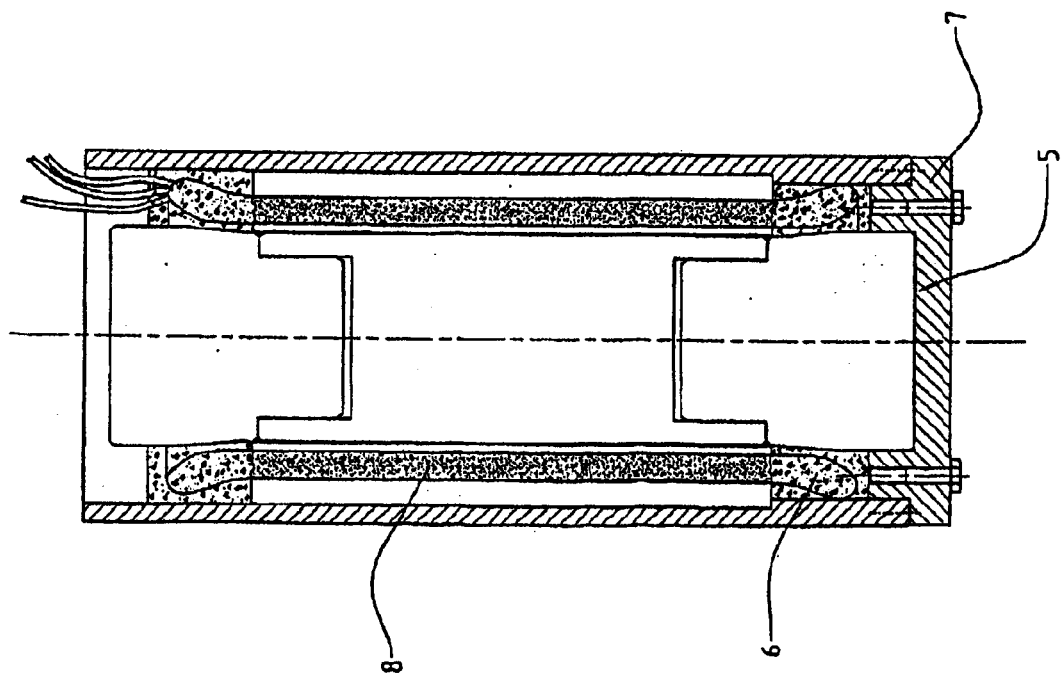
FIG. 4 is a section comprising the axis of the rotating machine, illustrating a final phase in the process according to the invention.

Impregnation of the second winding head is then performed (see FIG. 4) using a composition for impregnating winding heads, preferably by means of the same composition 6 for impregnating windings head as was used for the first winding head. The core 5 is then disassembled, and the result is the structure shown in FIG. 5, namely a stator ready to receive a rotor, end plates at the axial ends, connectors and, where appropriate, other auxiliary elements such as a cooling circuit.

Figure 6:
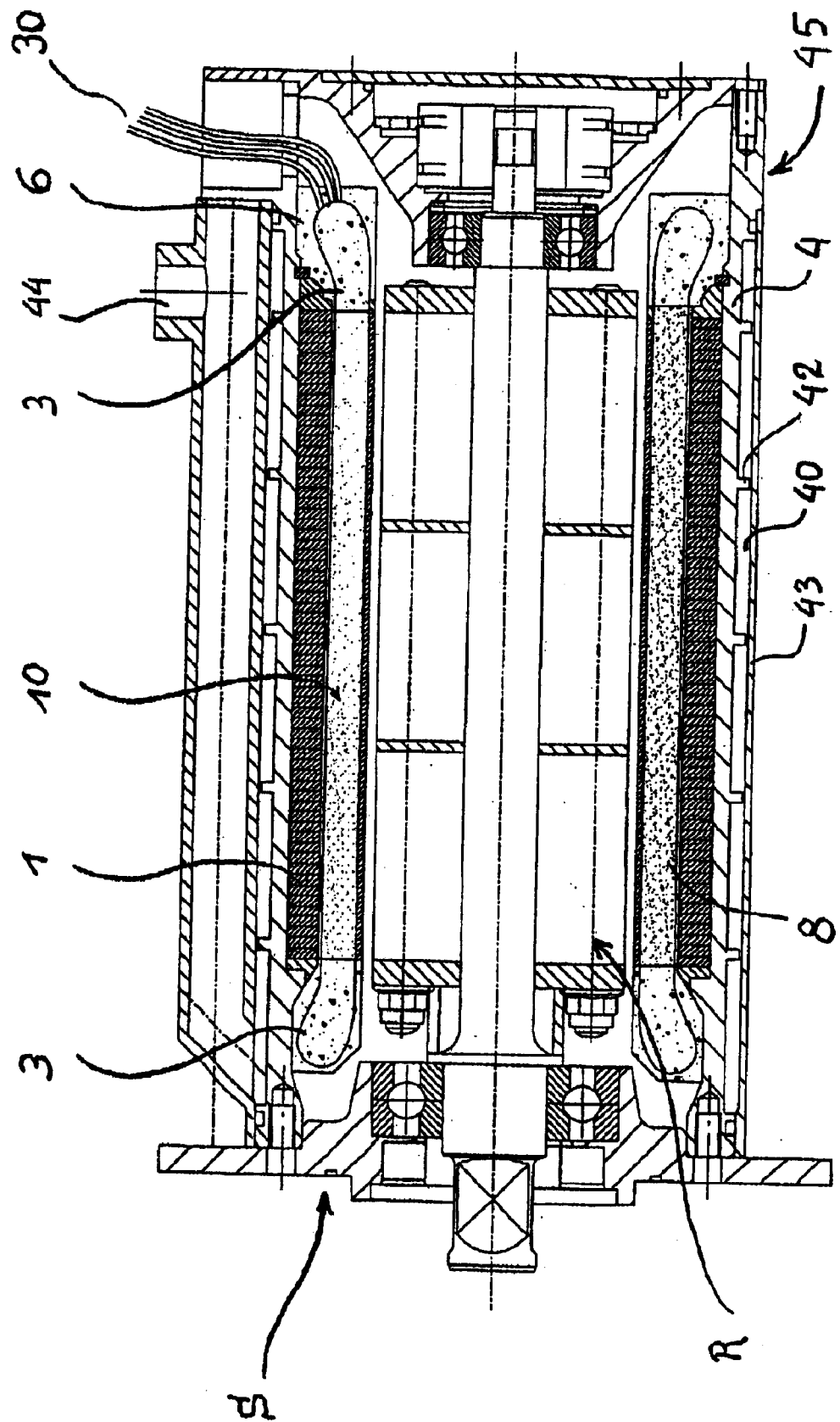
FIG. 6 is a section comprising the axis of a rotating machine according to the invention, showing the stator and the rotor.

In FIG. 6, there is seen an electrical rotating machine comprising a stator S and a rotor R which is mounted inside the stator S. This is the most common structural arrangement for electrical machines, but this arrangement is of course not restrictive with regard to the invention. The stator S comprises a laminated magnetic circuit 1. The stator has winding heads 3 at the two axial ends of the magnetic circuit. The sheath 4 is made from a metal material and forms, at least in part, the outer shell 45 protecting the electrical members and guaranteeing the mechanical behavior of the motor. A circuit 40 intended for the circulation of a cooling liquid is located in the sheath 4. To this end, the sheath 4 has on its outer surface a thread 42. An outerjacket 43 is mounted around the sheath 4. The circuit 40 is in a coil shape. One of the apertures 44 allowing the motor to be connected to a source of cooling fluid is shown.

For some applications, it is possible to use the slot-impregnating composition for the complete impregnation of a stator, including the winding heads. In this case, the step of impregnation of the conductors in the slots under vacuum, described with reference to FIG. 3, allows complete impregnation, with this step starting with impregnation of the lower winding head, then the slots, and finally the upper winding head, using the same impregnating composition. Some slot compositions proposed by the present invention have sufficiently high thermal conductivity for this purpose, even though specific compositions for impregnating winding heads may have a higher thermal conductivity. The invention allows levels of conductivity for a composition compatible with impregnation of conductive wires in the slots to be achieved such that only a single composition with filler can be used for the whole stator, which simplifies manufacture.

A comparison has been made between the performance levels of a stator manufactured by means of the slot-impregnating composition described and in accordance with the impregnating process which has just been described and the performance levels of a motor which uses for the slots a resin without filler and identical to the slot-impregnating composition described above, and the same composition for impregnating winding heads. For an identical operating regime close to the maximum load on the motor, it has been found that the reductions in the maximum temperature achieved are in the order of 20° C. to 25° C. in the winding heads, proof of a very significant increase in the conduction through the slots, since the composition for impregnating the winding heads is identical, and on the order of 25° C. to 30° C. in the slots. Thus, an indirect gain is made as a result of the fact that the operating temperature has been lowered substantially and the electrical resistance of the windings has decreased slightly, which brings about a slight improvement in the output of the electrical rotating machine.

If we assume that the maximum operating temperature is unchanged, the result is that the intensity of current passing through the windings can be raised, and thus the power of the machine increased.

The invention may be used either to manufacture electrical motors or alternating generators. In order to improve the compactness of the motor still further, it may be provided for the stator to have a conduit system for the circulation of a cooling fluid, for example a cooling liquid of the type used in cooling heat engines of automotive vehicles.

What is claimed is:

1. An electrical rotating machine, comprising a rotor having an axis of rotation, a stator, the stator comprising a laminated magnetic circuit having a stack of magnetic metal sheets disposed substantially parallel to a plane perpendicular to the axis of rotation of the rotor, the magnetic circuit having a plurality of teeth, the teeth delimiting longitudinally oriented slots, each slot having a useful section in a sectional plane substantially perpendicular to the axis of rotation of the rotor, longitudinally extending electrically conductive wires being disposed in the slots, each wire having a section in said sectional plane circumscribed by a virtual square, the ratio of the sum of the sections of said virtual squares in said sectional plane to the useful slot section in said sectional plane being greater than 0.7 for each slot, the slot wires being kept immobile by a slot-impregnating composition containing a heat-setting resin and a filler of particle size such that the average size of the particles is less than approximately 15 $\mu$m and such that at least approximately 80% by mass of the particles are less than 25 $\mu$m in size, the slot-impregnating composition comprising at least 65% by mass the filler.

2. An electrical rotating machine, comprising a rotor having an axis of rotation, a stator, the stator comprising a laminated magnetic circuit having a stack of magnetic metal sheets disposed substantially parallel to a plane perpendicular to the axis of rotation of the rotor, the magnetic circuit having a plurality of teeth, the teeth delimiting longitudinally oriented slots, each slot having a useful section in a sectional plane substantially perpendicular to the axis of rotation of the rotor, longitudinally extending electrically conductive wires being disposed in the slots, each wire having a section in said sectional plane circumscribed by a virtual square, the ratio of the sum of the sections of said virtual squares in said sectional plane to the useful slot section in said sectional plane being greater than 0.7 for each slot, the slot wires being kept immobile by a slot-impregnating composition containing a heat-setting resin and a filler of particle size such that the maximum size of the particles is less than $0.045*\phi$, where $\phi$ is the diameter of the electrically conductive wires disposed in the slots, the slot-impregnating composition comprising at least 65% by mass the filler.

3. A machine according to claim 1 or 2, in which the particle size of the filler is such that at most 3% by mass of the particles are above 50 $\mu$m in size.

4. A machine according to claim 1 or 2, in which the slot-impregnating composition comprises at least 70% by mass the filler.

5. A machine according to claim 1 or 2, in which the filler of the slot-impregnating composition is selected from the group comprising silica flour, quartz, aluminum nitride and alumina.

6. A machine according to claim 1 or 2, in which the particle size of the filler of the slot-impregnating composition is such that the average size of the particles is less than approximately 10 $\mu$m and is such that at least approximately 80% by mass of the particles are of a size below 20 $\mu$m.

7. A machine according to claim 6, in which the particle size of the slot-impregnating composition is such that approximately at most 3% by mass of the particles are above 45 $\mu$m in size.

8. A machine according to claim 1 or 2, having winding heads at the two axial ends of the magnetic circuit, the conductors in the winding heads being impregnated with a composition for impregnating winding heads which contains a heat-setting resin and a filler of larger particle size than the particle size of the filler of the slot-impregnating composition.

9. A machine according to claim 8, in which the particle size of the filler of the composition for impregnating winding heads is such that it has approximately from 30 to 55% by mass of particles having a size between 500 $\mu$m and 1000 $\mu$m, has approximately from 25 to 45% by mass of particles having a size between 200 $\mu$m and 600 $\mu$m, with the remainder being composed of at least 5% by mass of particles of which at least 80% by mass are below 25 $\mu$m in size and at most 3% by mass are above 50 $\mu$m in size.

10. A machine according to claim 9, in which the particle size of the filler of the composition for impregnating winding heads is such that it has a remainder composed of at least 5% by mass of particles of which at least 80% by mass are below 20 $\mu$m in size and at most 3% by mass are above 45 $\mu$m in size.

11. A machine according to claim 1 or 2, in which the laminated magnetic circuit is mounted inside a sheath made of a metal material.

12. A machine according to claim 2, in which the diameter of the electrically conductive wires is within the range of from about 1.2 mm to about 1.5 mm.

* * * * *

UNITED STATES PATENT AND TRADEMARK OFFICE
CERTIFICATE OF CORRECTION

PATENT NO. : 6,756,710 B2
DATED : June 29, 2004
INVENTOR(S) : Gerald Bourqui et al.

It is certified that error appears in the above-identified patent and that said Letters Patent is hereby corrected as shown below:

Column 1,
Line 63, "to;" should read -- to --.

Column 2,
Line 34, "beat" should read -- heat --.

Column 5,
Line 64, "pronyotes" should read -- promotes --.

Column 6,
Line 16, "stored." should read -- stoved --.

Column 7,
Lines 10 and 51, "circuit 1" should read -- circuit 1 --;
Line 41, "1" should be deleted.

Column 8,
Line 54, "outerjacket 43" should read -- outer jacket 43 --.

Signed and Sealed this

Twenty-second Day of February, 2005

JON W. DUDAS
*Director of the United States Patent and Trademark Office*